United States Patent Office 3,390,127

Patented June 25, 1968

3,390,127

WATER-SOLUBLE KETONE-ALDEHYDE-PHENOL RESINS AND PROCESS OF MAKING SAME

John W. Schick and John H. Stockinger, Cherry Hill, and Robert M. Gemmill, Jr., Woodbury, N.J., assignors to Mobil Oil Corporation, a corporation of New York

No Drawing. Continuation of application Ser. No. 354,435, Mar. 24, 1964. This application Sept. 28, 1967, Ser. No. 671,488

8 Claims. (Cl. 260—50)

ABSTRACT OF THE DISCLOSURE

A water-soluble, thermosettable resin is produced by reacting an aldehyde, a ketone, and a phenol in a one-step polycondensation reaction that is catalyzed with a base. In the final resin product the molar proportions of aldehyde, ketone, and phenol present are between about 3 and about 6 moles of the aldehyde, between about 1 and about 1.5 moles of the ketone per mole of the phenol. These resins are useful as binders for bonded products made from fibers, particles, or sheets, which bonded products possess properties of high bond strength and are resistant against weakening of the bond from exposure to water.

This application is a continuation of application, Ser. No. 354,435, Mar. 24, 1964.

This invention relates to water-soluble resins, and more particularly water-soluble ketone-aldehyde-phenol resins, which can be thermoset to provide binders for fibers, particles and sheets. The invention also relates to a process for making such resins, and to bonded products containing a binder produced by thermosetting such resins.

As is well known to those familiar with the art, a wide variety of construction boards have been produced by bonding fibers, particles, and sheets with suitable binders. Such boards include plywood, chip board, particle board, fiberboard, laminates and others.

In this specification and the claims, the terms "fibers," "particles," and "sheets" encompass a wide variety of materials of mineral and vegetable origin, and synthetic organic materials like Dacron and nylon. Typical minerals from which construction materials can be made include gypsum, asbestos, fiberglass and the like. However, construction boards which are more economical for many purposes can be made by bonding fibers, particles or sheets of vegetable origin, usually cellulosic materials, into desired configurations. The term "cellulosic," as used herein, is embracive of substances from various plants and trees that contain the lignocellulosic complex. The term "cellulosic materials," therefore, as used herein, includes fibers, chips, shavings, sheets, sawdust and the like, derived from various plants and trees, and also includes hard woods, soft woods, cotton, bagasse, kenaf, hemp and jute.

A variety of materials have been proposed for use as binders for fibers, particles and sheets. In the interests of greater strength and durability of the bonded products, materials that can be cured to an insoluble, infusible binder are highly desirable. As materials which can be thermoset to provide such binders, there have been proposed phenol-formaldehyde, urea-formaldehyde, and melamine-formaldehyde resins.

Before being thermoset, most resins of these types are applied in the form of solutions or of paste-like slurries. However, ketone-aldehyde-phenol resins used in the past have been water-insoluble or only poorly water soluble, necessitating the use of an organic solvent, such as an alcohol or an ester, to dissolve the resin for convenient application to the materials to be bonded. To the best of our knowledge, with the exception of the resin disclosed in copending application for Letters Patent, Ser. No. 310,920, filed September 23, 1963, by John W. Schick and John H. Stockinger, the ketone-aldehyde resins used in the past have also been completely or largely water-insoluble and have likewise required the addition of an organic solvent before application to the materials to be bonded. To avoid the safety hazards associated with the use of organic solvents, especially at elevated temperatures, resins which are water-soluble and which can be thermoset to provide a strong, durable binder, are highly desirable. Generally, bonded products exposed to the elements lose bond strength more rapidly than those used in areas protected from the weather, because many prominently used types of binders tend to gradually deteriorate on frequent or prolonged contact with water. To obtain bonds which are more durable in adverse environments, and particularly under severe weather conditions, water-soluble resins which can be thermoset to provide a binder which retains its strength despite exposure to the weather or to water from other sources, are especially desirable. Water-soluble resins acquiring such resistance, on being thermoset, to deterioration under adverse weather conditions are even more desirable if they can be produced inexpensively enough that products bonded therewith can be economically used in either protected or exposed environments, and the need for maintaining separate sales inventories of products for interior and exterior used can be thereby avoided. Known resins which can be thermoset, e.g. ketone-aldehyde resins having a molar ratio of between one and two moles of aldehyde per mole of ketone, have exhibited significant water solubility only in conjunction with relatively low molecular weights and correspondingly low viscosities. During the thermosetting process, which employs elevated pressures and temperatures, resins of low viscosity tend to penetrate the materials being bonded, generally leaving insufficient binder at the bonding points or surfaces and resulting in an unacceptably weak bond. It has been proposed that resins which are more water-soluble might be produced by the reaction of between 3 and 5 moles of formaldehyde with each mole of acetone, but the resins so produced do not cure to give satisfactory bond strength.

It has now been found that resins which are highly water-soluble, even in solutions which are substantially neutral, e.g. having a pH of between 7.0 and 9.0, and which can be thermoset to provide bonds which retain good strength, even under exposure to water or severe weather conditions, can be produced by the reaction of controlled proportions of a ketone reactant, an aldehyde reactant and a phenol reactant in the presence of a basic catalyst.

Accordingly, it is a broad object of this invention to provide novel binders for fibers, particles and sheets. Another object is to provide bonded products bonded with the novel binders. Another object is to provide novel water-soluble resins of desirably high molecular weight and desirable viscosity, which can be prepared from ketones, aldehydes and phenols and which can be thermoset to provide such novel binders. A specific object is to provide a water-soluble resin which can be thermoset to provide a binder for cellulosic materials and which is prepared by a reaction of ketones, aldehydes and phenols. Another specific object is to provide bonded products comprising cellulosic materials bonded with such binders. A further specific object is to provide bonded products having good bond strength and good resistance to bond strength deterioration from exposure to water and adverse weather conditions. Other objects and advantages of this invention will become apparent to those skilled in the art, from the following detailed description.

In general, the present invention provides a water-soluble resin which can be thermoset to provide a binder for bonded products made from fibers, particles or sheets, which bonded products have properties of water resistance and strength of bond at least equivalent to, and in most cases superior to, those properties regarded as standards of acceptability in the manufacture of such bonded products. The water-soluble resin of this invention comprises the product of the reaction of a ketone reactant, an aldehyde reactant and a phenol reactant, said reactants being reacted in molar proportions of between about 2 and about 8 moles of aldehyde reactant per mole of phenol reacted, and of between about 0.5 and about 2 moles of ketone per mole of phenol reacted, said reaction being conducted in the presence of a base capable of catalyzing the condensation reaction of said ketone reactant, said aldehyde reactant and said phenol reactant. The foregoing molar proportions in which the ketone, aldehyde and phenol react can be alternatively expressed on the basis of a mole of the ketone reactant. So expressed, the ketone reactant, aldehyde reactant and phenol reactant are reacted in molar proportions of between about 1 and about 16 moles of aldehyde per mole of ketone and between about 0.5 and about 2 moles of phenol per mole of ketone.

The invention also includes the process of making such resin, which process comprises reacting a ketone, an aldehyde and a phenol in molar proportions of between about 2 and about 8 moles of aldehyde per mole of phenol and of between about 0.5 and about 2 moles of ketone per mole of phenol, and in the presence of a base capable of catalyzing the condensation reaction.

The invention also provides a bonded product, e.g. one comprising cellulosic material, bonded with a binder produced by thermosetting the water-soluble resin of this invention.

The ketone reactant used in the preparation of the resins of this invention can be any ketone having at least one hydrogen atom on each carbon atom alpha to the carbonyl group, or a mixture of two or more of such ketones. Suitable ketones include the aliphatic, particularly lower alkyl, and the cycloaliphatic ketones. Non-limiting examples of the ketone reactant are acetone, methyl ethyl ketone, ethyl ketone, methyl propyl ketones, methyl butyl ketones, ethyl propyl ketones, dihexyl ketone, cyclohexanone, acetonyl acetone, diacetone and mixtures of any of the foregoing ketones. Particularly preferred ketone reactants are acetone, methyl ethyl ketone and other ketones having alkyl groups containing up to three carbon atoms attached to the carbonyl group.

The aldehyde reactant used in the preparation of the resins of this invention can be any compound having an active $$-\overset{\displaystyle H}{\overset{|}{C}}=O$$

group characteristic of the aldehydes. Suitable aldehyde reactants include the aliphatic aldehydes and aromatic aldehydes, including heterocyclic aldehydes. Non-limiting examples of suitable aldehyde reactants are formaldehyde (including polymeric forms, e.g. paraformaldehyde), acetaldehyde, propionaldehyde, butyraldehyde, acrolein, crotonaldehyde, tigladehyde, benzaldehyde, salicylaldehyde, cinnamaldehyde, glyoxal and mixtures of any of the foregoing aldehydes. Formaldehyde, being inexpensive and readily available, is a preferred aldehyde reactant.

The phenol reactant used in the preparation of the resin of this invention can be any phenol having hydrogen atoms in at least two and preferably at least three active nuclear positions. Suitable phenol reactants include unsubstituted phenol and substituted phenols such as alkyl-phenols, in which the alkyl groups are preferably lower alkyl groups. Other preferred substituted phenols include meta-substituted phenols and various para-substituted phenols, e.g. p-amino phenol. Non-limiting examples of phenols suitable for the reaction of this invention include phenol, cresols, xylenols, ethylphenols, propylphenols, butylphenols, amylphenols, phenylphenols, cyclohexylphenols and mixtures of any of the foregoing phenols. Mono-phenols of lower molecular weight are preferred, as are phenols which are relatively unemcumbered against ring reactions, such as, if a substituted phenol reactant is desired, a phenol which is substituted by relatively few groups.

In the synthesis of the resin of this invention, the purity of the ketone, aldehyde and phenol in the reaction mixture is not critical, so long as the proper mole ratios of the reactants in the mixture are maintained. Accordingly, the reactants need not be combined in their pure forms, but one or more of them may instead be added to the mixture in impure form, such as in a form including side products resulting from the reaction or decomposition of other compounds to form the ketone, aldehyde or phenol reactant. For example, when the desired ketone reactant is acetone and the desired phenol reactant is unsubstituted phenol, cumene hydroperoxide can be conveniently decomposed under anhydrous conditions to yield a cumene solution of acetone and phenol for use in the process of this invention. It has also been found that the products of such a decomposition reaction can be used in the process of this invention without purification or removal of decomposition by-products such as, in the decomposition of cumene hydroperoxide, minor proportions of acetophenone and alpha-methyl styrene, and without impairment of the water-solubility of the resin produced or of the strength or water-resistance of the bond produced by thermosetting the resin.

The reaction productive of the water soluble resins of this invention is a condensation reaction which is base-catalyzed. The catalyst can be any base which is capable of catalyzing the reaction of the ketone reactant, the aldehyde reactant and the phenol reactant. The catalyst will generally be added in a catalytic amount to the reaction mixture in the form of an aqueous solution, e.g. an aqueous solution having a concentration of 1% to 20% of a strongly ionized base, such as sodium hydroxide or potassium hydroxide, or as a concentrated solution of a partially ionized base such as ammonium hydroxide, although the concentration of the base as added to the reaction mixture is not critical. In general practice, when a strongly ionized base is used, it will preferably be present in the reaction mixture in a concentration between 0.02 mole and 0.15 mole, and more preferably between 0.05 mole and 0.08 mole, of the base per mole of the phenol reactant initially present in the reaction mixture. When a partially ionized base is used, it will preferably be present in the reaction mixture in a concentration between 0.03 mole and 0.08 mole, and more preferably about 0.07 mole, per mole of the phenol reactant initially present in the reaction mixture.

It has been found that the ketone-aldehyde-phenol resin of this invention, which is water-soluble and which can be thermo-set to effect a bond having good strength and having good resistance against weakening of the bond by exposure to water or severe weather conditions, can be produced by controlling the proportions of ketone, aldehyde and phenol initially present in the reaction mixture from which the resin is condensed, and thereby controlling the proportions of ketone, aldehyde and phenol which condense to form the resin. The resin of this invention, which is believed to be a ketone-aldehyde-phenol copolymer, is the product obtained by reacting a ketone, an aldehyde and a phenol in molar proportions of between about 2 and about 8 moles, preferably between 3 and 6 moles, of aldehyde per mole of phenol, and of between about 0.5 and about 2 moles, preferably between 1.0 and 1.5 moles, of ketone per mole of phenol. It has been found that this resin can be obtained by reacting a ketone, an aldehyde and a phenol in the presence of a base capable of catalyzing reaction of the ketone, the aldehyde and the phenol, and in the presence of an excess of the ketone of between 50% and 100% over that proportion of said ketone which is reacted to form the aforedescribed ketone-aldehyde-phenol resin of this invention. With such an excess of ketone present, the ratios of aldehyde, ketone and phenol initially present in the reaction mixture are between about 2 and about 8 moles of aldehyde per mole of phenol and between about 0.7 and about 4 moles of ketone per mole of phenol. The immediately preceding molar ratios of ketone, aldehyde and phenol initially present in the reaction mixture can be alternatively expressed on the basis of a mole of ketone. So expressed, the ratios of ketone, aldehyde and phenol initially present in the reaction mixture are between about 0.5 and about 11 moles of aldehyde per mole of ketone and about 0.2 and about 1.4 moles of phenol per mole of ketone.

The condensation reaction involved in this invention can be carried out in the presence of water, which can be introduced by adding the basic catalyst in aqueous solution or by charging at least a part of the aldehyde reactant in an aqueous solution, such as formalin when formaldehyde is the aldehyde reactant. The total amount of water used is not a critical factor, except that there should be sufficient water present to dissolve the resin product. There can be as much as 30 moles or more of water per mole of phenol present in the reaction mixture, with the maximum amount of water used usually being limited only by the amount that can be handled, as a practical matter. After reaction, the water content of the resin solution can be adjusted, as described hereinafter.

The reaction between the ketone, the aldehyde and the phenol will generally be carried out at temperatures between about 125° F. and about 350° F. Within such a range of temperatures, the process is generally carried out at relatively higher temperatures when using a relatively less ionized base as the reaction catalyst, and at relatively lower temperatures when using a relatively more ionized base as reaction catalyst. In preferred practice, when a strongly ionized base, e.g. sodium hydroxide, is used as catalyst, the reaction will preferably be carried out at temperatures between 140° F. and 195° F., while the reaction will preferably be conducted at temperatures between 225° F. and 300° F. when the catalyst is a base which is only partially ionized, e.g. ammonium hydroxide. Within the aforesaid temperature ranges, a decrease in the strength of the base can generally be compensated by an increase in the reaction temperature. The reaction time required to produce the water-soluble resin of this invention will vary inversely with the reaction temperature and will be usually between 5 minutes and 4 hours, and more frequently between 30 minutes and 3 hours. When it is desirable to conduct the reaction at a slightly lower temperature for a slightly longer period of time, this can be accomplished by any suitable method of controlling the temperature of the reaction mixture, such as by removing heat of reaction from the reaction vessel by heat exchange, e.g. with a water-filled cooling jacket, or by controlling the rate of addition of the basic catalyst to the reaction mixture, e.g. by adding the catalyst continuously or in time-spaced increments rather than adding all of the catalyst to the mixture before reaction has begun.

It will be recognized that, at the reaction temperatures used, some or all of the catalyst, water, and many aldehyde and ketone reactants will be volatile. Accordingly, in order to obtain good yields of the water-soluble resins of this invention, some provision should be made to retain the reactants in the reaction vessel. This can be done by using a reflux condenser. Preferably and more feasibly, the reaction can be carried out in an enclosed vessel, such as a kettle or an autoclave. In this case there will be a pressure build-up attributable to the vaporization of reactants.

Upon completion of the reaction, the resin product is present in a more or less viscous, aqueous solution. The basic catalyst can be destroyed by neutralization with an acid, such as hydrochloric acid or carbon dioxide. Following neutralization of the catalyst, the concentration of the resin in its solution can be adjusted to any desired level by adding or removing water. It has been found that the resin of this invention can be dissolved in aqueous solution in high concentrations as 65 wt. percent or more, which are desirable for the purpose of avoiding the weakness of bond resulting from excessive penetration of porous bonded surfaces which is characteristic of more dilute solutions of resin. It has also been found that such highly concentrated solutions of the resin of this invention have a viscosity low enough that they can be used in spray applications. To obtain such highly concentrated solutions, the removal of water is feasibly effected by heating the resin solution under reduced pressure. It has also been found that by the use of carefully controlled ratios of various forms of the aldehyde reactant and by carefully controlling the amount of water charged, it is possible to produce mixtures which, following reaction, contain as high as 65 wt. percent resin. For example, when formaldehyde is used as the aldehyde reactant, it can be introduced into the reaction mixture as a controlled ratio of formalin solution (37% formaldehyde) and paraformaldehyde, or as a controlled ratio of solid paraformaldehyde and water, to obtain a mixture which, following reaction, will contain about 65 wt. percent resin without further adjustment of the water content. Particularly in cases in which water resistance of the binder is not the most important of desired properties, the resin can be applied in this form for use as a thermoplastic binder for particles, fibers, sheets or other materials.

To produce bonded products having strong bonds and good resistance against weakening of the bonds from exposure to water, the water-soluble resin of this invention can be thermoset to form an insoluble, infusible polymer with the use of a basic catalyst. A mixture of a basic catalyst and a water solution of the resin, having proper viscosity, is applied to fibers, particles or sheets, and bonded products are formed therefrom by molding under heat and pressure to cure the resin to a thermoset polymeric binder. To form bonds of strength equivalent to or greater than that regarded in the industry as acceptable for conventional uses, the water-soluble resin of this invention should be applied, prior to being thermoset, in an aqueous solution having a proper resin concentration, e.g. between 32% and 65% or higher, and having a viscosity between about 5 seconds and about 9 seconds at between 62% and 65% resin content when measured by the Gardner-Holdt method (ASTM Designation D1545–60) at ambient temperature (about 77° F.). If the viscosity or concentration of the resin solution is too low, there will be too much penetration of the material to be bonded, leaving insufficient binder at the bonding points or surfaces. This results in what is known as a "starved glue line," and in an unacceptably weak bond.

In cases where the reacted mixture containing the resin has the proper viscosity to be applied without water content adjustment, the condensation reaction catalyst present in the reacted mixture may suffice as the thermosetting catalyst, so that the addition of more catalyst would not be necessary. The basic catalyst used in the curing (thermosetting) step can be sodium carbonate or an inorganic base such as ammonium hydroxide or alkali or alkaline earth metal hydroxides (e.g., sodium hydroxide, potassium hydroxide, or calcium hydroxide), or an organic base such as a dialkylamine (e.g., dimethylamine or diethylamine), an alkylenediamine (e.g., ethylenediamine), a polyalkyleneamine (e.g., hexamethylenetetramine, diethylenetriamine or triethylenediamine), an alkyleneimine (e.g., pyrroline, pyrrolidine, piperidone or piperazine), an amine-terminated polyamide resin, or quanidine. The amount of basic catalyst used to effect the thermosetting cure is generally beween about 0.5 percent and about 12 percent, by weight of the resin. Generally, about 2 to 8 percent is satisfactory.

As has been mentioned hereinbefore, the bonded products of this invention include particle board, fiber board and plywood. They are all prepared by the same general method of covering a surface of the fibers, particles or sheets with the binder, and then heating under pressure.

Particle board can be prepared from various particles manufactured for this use, or it can include wood particles found as waste in sawmills, lumber yards, carpentry shops, etc. Such waste particles can include sawdust, chips, or shavings. Waste ends can also be used, if they are comminuted to a proper particulate form. Wood particles coated with the binder and thermosetting catalyst are generally placed in a molding press of desired size and shape and subjected to heat and pressure. The compactness and hardness of the product particle board is governed to a great extent by the amount of pressure used. In general, pressures of from about 50 p.s.i.g. up to about 800 p.s.i.g. are employed. Molding is usually carried out at temperatures between about 300° F. and about 425° F. The molding temperature should not exceed temperatures in the order of about 450° F., above which charring of the cellulosic material may occur. The preferred molding time will be dependent upon the temperature and flow characteristics of the resin being thermoset. Time should be allowed to permit the resin to be distributed evenly and to thermoset sufficiently to provide a board of reasonable uniformity. The period of time can be between about 3 minutes and about 1 hour. In general practice, molding time will generally be between about 3 minutes and about 15 minutes.

Fiberboards are prepared by admixing mineral or vegetable fibers with the resin of this invention and catalyst. The resin of this invention is particularly advantageous for making fiberboards from relatively inexpensive or waste fibers, such as kenaf and bagasse. The mixture of fibers and binder is then molded into boards, using the techniques described for particle boards.

Plywoods are made by coating the surfaces of thin sheets of wood with mixtures of the resin and catalyst for thermosetting the resin. The coated wood sheets are then stacked one on top of another to the desired thickness, usually with the directions of the grain of adjacent sheets oriented at right angles to each other. The stack of sheets or plies is then heated under pressure, usually applied at right angles to the resin-coated surfaces.

If it is desirable to extend the resin of this invention, e.g. for economic reasons, this can be accomplished by adding a filler to the resin prior to the thermosetting step. Fillers which are suitable for this purpose, such as for example, clay, wood flour, soya flour, and dried blood, can be added in relatively large proportion without impairing the properties of good bond strength and resistance to bond weakening from the action of water which are characteristic of the binder obtained by thermosetting the resin of this invention.

The amount of resin applied to the cellulosic material to make the particle boards, fiberboards or plywood board should be sufficient that the finished board will contain, by weight, between about 4% and about 30% of binder.

The following specific examples are for the purpose of illustrating the preparation of the resin of this invention from a ketone, an aldehyde and a phenol, and further demonstrate the effect of variables upon bond strength of the thermostat binder produced with the resins. It will be understood that this invention is not to be limited to the specific reactants and catalysts used in the examples, or to the particular operations and manipulations involved. Other ketone, aldehyde and phenol reactants and catalysts as defined hereinbefore can be used, as those skilled in the art will readily appreciate.

Example I 87.0 grams (1.5 moles) of acetone, 180 grams of paraformaldehyde (6 moles of formaldehyde), 94 grams (1.0 mole) of phenol and 180 grams of water were charged to a one-liter kettle equipped with a stirrer, a thermometer and a condenser. The mixture was heated to 140° F. and 25 milliliters of 10% aqueous sodium hydroxide was continuously added over a period of 20 minutes, with the temperature rising to a reflux temperature of 185° F. in that time. The reaction mixture was refluxed for 2 hours and 10 minutes after the catalyst addition, after which the mixture was cooled to room temperature. The product was distilled under reduced pressure, removing 170 grams of unreacted acetone and water. The solids (resin) content of the resultant aqueous product was 64%, its pH was approximately 8.0 and it was soluble in 1.15 times its own volume of water. The amount of unreacted acetone recovered amounted to 17.6% of that charged. On the basis of the reaction of all of the formaldehyde and phenol, the molar proportions of formaldehyde:acetone:phenol in the product were 6.0:1.24:1.0. The viscosity of the product ranged from 13.4 to 43.0 seconds on the Gardner-Holdt scale. Data demonstrating lap shear strength of bond obtained by thermosetting the resin produced are given in Table I.

Example II

The process described in Example I was duplicated with the exception that the amount of acetone charged to the kettle was 116 grams (2.0 moles) and the amount of unreacted acetone recovered was 27.3 grams (0.47 mole). The mole ratio of formaldehyde:acetone:phenol in the resin product was 6.0:1.53:1.0. At 64.7% solids content, the resin solution was soluble in 1.85 times its own volume of water. The product had a very desirable viscosity range of from 5.0 to 11.2 seconds. Strength of bond data for the thermoset resin are given in Table I.

Example III

The process described in Examples I and II was duplicated with the exception that the amount of acetone charged to the kettle was 145 grams (2.5 moles) and the amount of unreacted acetone recovered was 43.4 grams (0.75 mole). The mole ratio of formaldehyde: acetone:phenol in the product was 6.0:1.75:1.0. At 62.9% solids content, the solution was soluble in 2.45 times its own volume of water. The viscosity of the product was low, ranging from 4.5 to 6.6 seconds. Data demonstrating lap shear strength of bonds obtained by thermosetting the resin produced are given in Table I. By comparing the results of Examples I, II and III, it was observed that the composition charged in Example II gave the most desirable combination of viscosity, water solubility and lap shear strength.

Example IV

The process of Example II was duplicated with the exception that 90.0 grams (3.0 moles) of formaldehyde (as paraformaldehyde) was charged instead of 6.0 moles. The total reaction time was 3.0 hours instead of 2.5 hours as in Examples I, II and III. A total of 38.1% of the acetone charged was recovered unreacated (44.2 grams, 0.76 mole). The mole ratios of formaldehyde:acetone: phenol in the product were 3.0:1.24:1.0. The solution contained 59.0% solids content and was soluble in 1.45 times its own volume of water. The viscosity of the product was very low, a steady 1.2 seconds on the Gardner-Holdt scale. Data demonstrating lap shear strength of bonds obtained by thermosetting the resin produced are given in Table I.

Example V 290 grams (5.0 moles) of acetone, 648 grams of Formalin solution containing 37% formaldehyde (8.0 moles of formaldehyde), 248 grams of paraformaldehyde containing 95% formaldehyde (8 moles of formaldehyde)

and 282 grams (3.0 moles) of phenol were charged to a stirred autoclave. The mixture was heated to 140° F. and 10 milliliters of concentrated ammonium hydroxide and after they had been immersed in boiling water for 4 hours. The results of the lap shear stress tests are given in Table I.

TABLE I

| Example No. | Reactants charged, moles | Acetone recovered unreacted, moles | Condensation catalyst | Reaction time at reflux temperature, hrs. | Lap Shear Strength, p.s.i. [1] | | |
|---|---|---|---|---|---|---|---|
| | | | | | Dry | Soak | Boil |
| I | Acetone, 1.5; Formaldehyde,[2] 6.0; Phenol, 1.0 | 0.26 | 25 mls. of 10% aqueous NaOH | 2.25 | 485 (80) | 416 (90) | 397 (60) |
| II | Acetone, 2.0; Formaldehyde,[2] 6.0; Phenol, 1.0 | 0.47 | do | 2.25 | 470 (90) | 397 (90) | 399 (80) |
| III | Acetone, 2.5; Formaldehyde,[2] 6.0; Phenol, 1.0 | 0.75 | do | 2.25 | 415 (50) | 350 (30) | 342 (20) |
| IV | Acetone, 2.0; Formaldehyde,[2] 3.0; Phenol, 1.0 | 0.76 | do | 2.75 | 458 (70) | 419 (80) | 355 (70) |
| V | Acetone, 5.0; Formaldehyde, 16.0; Phenol, 3.0 | [3] 2 | 30 mls. of conc. $NH_4OH$ | 0.5 | 372 (70) | 400 (90) | 342 (70) |
| VI | Acetone, 5.0; Formaldehyde, 16.0; Phenol, 3.0 | [3] 2 | do | 0.75 | 494 (40) | 349 (10) | 364 (10) |

[1] Values in parentheses indicate the percent of wood failure in each shear stress test.
[2] All of formaldehyde charged as paraformaldehyde.
[3] Approximate.

(28% ammonia was carefully added through a pressurized burette. The temperature was gradually raised to 200° F. over 15 minutes, after which another 10 milliliters of concentrated ammonium hydroxide was added. After maintaining the temperature at 200° F. for another 30 minutes, a final 10 milliliters of concentrated ammonium hydroxide was added and the reaction mixture was gradually heated to 260° F. over 30 minutes. After the temperature was maintained at 260° F. for 30 minutes, the mixture was cooled to room temperature, neutralized with concentrated hydrochloric acid to a pH of 7, and the product was distilled under reduced pressure, removing unreacted acetone. The resin produced was found to be soluble in water. Data demonstrating lap shear strength of bonds obtained by thermosetting the resin produced are given in Table I.

Example VI

The procedure described in Example V was duplicated with the exception that the reaction mixture was maintained at 260° F. for 45 minutes instead of 30 minutes. The resin product was found to have an average molecular weight of 430 and to be less water-soluble than that of Example V. The yield was found to be similar to that of Example V. Data illustrative of lap shear strength of bonds effected by thermosetting this resin are set forth in Table I.

Shear stress tests were performed to determine the bonding strength of each of the binders produced by thermosetting, in the manner described hereinbefore, each of the resins produced as described in Examples I through VI. Prior to the bond strength tests, 8 percent diethylenetriamine catalyst, based upon the weight of the resin, was admixed with the resin under test. The mixture of resin and catalyst was then used to coat one square inch of lapped birch veneers. Resins produced with sodium hydroxide catalyst were cured at 350° F. for 10 minutes, at just sufficient pressure to hold the veneers together. Resins produced with ammonium hydroxide were cured at 400° F. for 15 minutes. Medical tongue depressors (½" by 6") were used as the birch veneers. The lapped samples were conditioned for 48 hours at 70° F. and 50% relative humidity. Thereafter, the stress required to pull the lapped section apart by shearing was determined on a Tinius Olsen Stress instrument and noted in Table I as the test result for a "dry" bond. Shear stress tests were also performed on other veneer bonds similarly prepared from the resins of Examples I through VI, after the bonds had been water-soaked at room temperature for 48 hours From the data of Table I, it can be seen that, on being thermoset, all of the highly water-soluble resins produced as described in Examples I through VI provided bonds having good shear strength and high resistance to loss of shear strength from the action of water on the bonds.

As pointed out hereinbefore, one or more of the reactants in the process of this invention can be added to the reaction mixture in impure form, e.g. in a form including by-products of the preparation of that reactant by synthesis or by decomposition of a larger molecule. The following examples, without limiting the scope of the invention, illustrate the preparation of the resin of this invention by the reaction of a ketone, an aldehyde and a phenol, in which ketone and phenol are added to the reaction mixture in the form of the unpurified product of the decomposition of an aryl dialkyl methylhydroperoxide, i.e., cumene hydroperoxide. In general, ketone and phenol can be derived for use in the process of this invention by the decomposition of any aryldialkyl methylhydroperoxide having the formula:

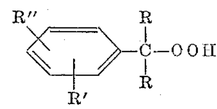

wherein R is alkyl and preferably lower alkyl ($C_1$–$C_3$), R' is alkyl or hydrogen and R'' is alkyl, hydrogen or dialkyl methylhydroperoxide. The selection of a specific aryldialkyl methylhydroperoxide will depend on the nature and ratio of the ketone and phenol desired for use in the resin-productive reaction. Non-limiting examples of suitable aryldialkyl methylhydroperoxides include cumene methylhydroperoxide, dimethyl cumene hydroperoxide, methyl ethyl cumene hydroperoxide and diethyl cumene hydroperoxide. Since acetone is a preferred ketone and (unsubstituted) phenol a preferred phenol for purposes of this invention, cumene hydroperoxide is preferred as an aryldialkyl methylhydroperoxide which can be quantitatively decomposed to yield acetone and phenol.

To obtain the cumene hydroperoxide decomposition products used in the following examples, a dilute solution (25%) of cumene hydroperoxide in cumene was decomposed under anhydrous conditions to yield a cumene solution of phenol and acetone. The use of a 25% solution of the hydroperoxide facilities heat control during the decomposition reaction, although a less concentrated solution can be used, as can be a solution of greater concentration up to as high as 100%, if suitable measures for reaction heat control are provided. The solvent or diluent for the decomposition step is not restricted to cumene, but can alternatively be another aromatic or non-aromatic hydrocarbon or a mixture of more than one such diluent or solvent. The decomposition step can be carried out as either a batch or continuous process, and it can be catalyzed by either solid or liquid catalyst. In the preparation of ketone and phenol reactants for use in the following specific examples, the 25% solution of cumene hydroperoxide was decomposed over a solid acid catalyst of the type which includes Filtrol 120 and Durabead 5, at temperatures between 200° F. and 270° F. and a space velocity between 1.0 and 4.0, and under anhydrous conditions. Other temperatures and space velocities can be used with other types of catalyst suitable for the decomposition process and in other types of reactors. The decomposition products, including unreacted materials in concentration less than 1.0% and by-products formed in small yield, were soluble in the cumene present in the decomposition vessel, and the resulting solution was employed, without purification or separation in the resin-producing process of this invention, as described in the following examples. To produce the resin, the cumene solution containing cumene hydroperoxide decomposition products, primarily acetone and phenol, was combined with a proper proportion of formaldehyde, as defined hereinbefore, and an additional amount of acetone. The cumene solvent remained in an inert phase during resin synthesis and was easily separated from the water-soluble resin product. The separation of the cumene layer from the resin-containing aqueous layer can be accomplished by any suitable technique, e.g. decantation. The resin product obtained was found to be water-soluble and, on being thermoset in the manner described hereinbefore, possessed bond strength and resistance to weakening under adverse conditions equivalent to those properties of the resins produced in Examples I through VI. The resin yields were also found to be almost equivalent to those of Examples I through VI.

Example VII

In a continuous process reactor charged with a solid acid catalyst, a 23.8% solution of cumene hydroperoxide in cumene was decomposed as described hereinabove to yield 385.4 grams of decomposition product consisting of 7.4% (0.49 mole) acetone, 12.0% (0.49 mole) phenol, 76.2% cumene and 4.4% of by-products including acetophenone, alpha-methylstyrene and 2-phenyl-2-propanol. Without purification, this solution was combined with 35 grams (0.60 mole) of acetone, 162 grams of Formalin solution containing 37% formaldehyde (2.0 moles of formaldehyde), and 60 grams of paraformaldehyde (2.0 moles of formaldehyde). The reaction mixture was heated with stirring to 140° F. and a total of 20 milliliters of a 10% aqueous solution of sodium hydroxide were added over a period of 45 minutes. The reaction mixture was then raised to reflux at 185° F. for 90 minutes. The resin-containing aqueous phase weighing 338.3 grams was readily isolated. Water and unreacted acetone were distilled from the aqueous solution in the combined amount of 95 grams, leaving 243 grams of solution containing 60% resin and which was soluble in its own volume of water. Tests on the resin showed it had an average molecular weight of 245. Data demonstrating lap shear strength of bonds obtained by thermosetting the resin produced and resistance to loss of bond strength from the action of water on the bonds are shown in Table II.

Example VIII 659 grams of a decomposition product of cumene hydroperoxide identical to that described in Example VII were combined with 36.5 grams (0.63 mole) of acetone, 120 grams of paraformaldehyde (4 moles of formaldehyde) and 123 grams of water. The mixture was heated with stirring to 140° F. and a total of 15 milliliters of a 10% aqueous sodium hydroxide solution were added over a period of 45 minutes. The mixture was then refluxed at 185° F. for 90 minutes. The aqueous phase containing the resin was readily isolated from the cumene phase. After being stripped of 135 grams of water and unreacted acetone, the resin solution weighed 229 grams and had a resin concentration of 65%. Data demonstrating lap shear strength of bonds obtained by thermosetting the resin produced and resistance to loss of bond strength from the action of water on the bonds are shown in Table II.

Example IX 784 grams of a decomposition product of cumene hydroperoxide identical to that described in Examples VII and VIII were combined with 58 grams (1 mole) of acetone, 180 grams of paraformaldehyde (6.0 moles of formaldehyde) and 180 grams of water. The reaction mixture, which contained formaldehyde, acetone, and phenol in mole ratios of 6.0:2.0:1.0, respectively, was heated with stirring to 140° F. and a total of 25 milliliters of a 10% sodium hydroxide solution were added over a period of 45 minutes. The mixture was then refluxed at 185° F. for 2¼ hours. The aqueous phase containing the resin was readily isolated from the cumene phase. After 120 grams of water and unreacted acetone were distilled from the aqueous phase, it contained 430 grams of a solution containing 64% of resin solids. The resin solution could be dissolved in its own volume of water. There was no evidence of formaldehyde side reactions such as the Cannizzaro reaction. Analyses showed that 90.7% of the phenol, 57.6% of the acetone and all of the formaldehyde in the reaction mixture had reacted and that the mole ratios of formaldehyde:acetone:phenol in the resin product were therefore 6.6:1.3:1.0, respectively. The resin was found to have an average molecular weight of 239. Data demonstrating lap shear strength of bonds obtained by thermosetting the resin produced and resistance to loss of bond strength from the action of water on the bonds are shown in Table II.

Example X

A reaction mixture identical to that of Example IX with the exception of containing only 90 grams of paraformaldehyde (3.0 moles of formaldehyde) was reacted under conditions identical to those of Example IX. The mole ratios of formaldehyde:acetone:phenol in the reaction mixture were 3.0:2.0:1.0, respectively. After the reaction, 182 grams of water and unreacted acetone were distilled from the aqueous phase under reduced pressure, leaving 241 grams of solution containing 68% resin solids. The resin solution was soluble in 0.9 times its own volume of water. Analyses showed that 65% of the phenol, 30% of the acetone and all of the formaldehyde in the mixture had reacted, that no formaldehyde side products were present after the reaction, and that the mole ratios of formaldehyde, acetone and phenol in the resin product were therefore 5.0:1.0:1.0, respectively. Data demonstrating lap shear strength of bonds obtained by thermosetting the resin produced and resistance to loss of bond strength from the action of water on the bonds are shown in Table II.

Example XI

In a two-liter glass resin pot fitted with a mechanical stirrer, there were combined 141 grams (1.5 moles) of phenol, 145 grams (2.5 moles) of acetone, 120 grams of paraformaldehyde (4.0 moles of formaldehyde), 324 grams of Formalin solution containing 37% formaldehyde (4.0 moles of formaldehyde), 22 grams of alpha-methylstyrene, 6.1 grams of acetophenone and 793 grams of cumene, establishing mole ratios of formaldehyde, acetone and phenol in the reaction mixture of 5.3:1.7:1.0, respectively. The reaction mixture was heated to 140° F. and a total of 30 milliliters of a 10% aqueous solution of sodium hydroxide were added over a period of 45 minutes. The reaction mixture was then raised to reflux at 185° F. for 90 minutes. Thereafter the aqueous phase containing the resin and weighing 686 grams was isolated from the cumene phase. Water and unreacted acetone were distilled under reduced pressure from the resin solution in the combined amount of 151 grams, leaving 535 grams of solution containing 64% resin solids. The resin solution was soluble in 1.5 times its own volume of water without precipitation. Analysis of the resin showed it had an average molecular weight of 396. Data demonstrating lap shear strength of bond obtained by thermosetting the resin produced and resistance to loss of bond strength from the action of water on the bonds are shown in Table II.

Example XII

A reaction mixture identical to that of Example XI was heated to 140° F. and, over a period of 45 minutes, 35 milliliters of a 10% aqueous solution of sodium hydroxide were added, after which the mixture was raised to reflux at 185° F. for 90 minutes. Following the reaction, the aqueous phase containing the resin was readily separated from the cumene phase and, after removal of 158 grams of water and unreacted acetone by distillation, there remained 532 grams of a solution containing 62% resin solids. The resin solution was soluble in 1.5 times its own volume of water. Data demonstrating strength of bonds obtained by thermosetting the resin produced and resistance to loss of bond strength from the action of water on the bonds are shown in Table II.

Shear stress tests were performed to determine the bonding strength of each of the binders produced by thermosetting, in the manner described hereinbefore, each of the resins produced as described in Examples VII through XII. Prior to the bond stress tests, 2% diethylenetriamine and 3% hexamethylenetetramine, based on the weight of the resin, were admixed with the resin to be tested. The mixture of resin and catalyst was then used to coat one square inch of lapped birch veneers and cured at 400° F. for 15 minutes, at just sufficient pressure to hold the lapped veneers together. Medical tongue depressors (½" by 6") were used as the birch veneers. The lapped samples were conditioned for 48 hours at 70° F. and 50% relative humidity. Thereafter, the stress required to pull the lapped section apart by shearing was determined on a Tinius Olsen stress instrument and noted in Table II as the test result for a "dry" bond. Shear stress tests were also performed on other veneer bonds similarly prepared from the resins of Examples VII through XII, after the bonds had been water-soaked at room temperature for 48 hours and after they had been immersed in boiling water for 4 hours. The results of the lap shear stress tests are given in Table II.

From the data of Table II, it can be seen that, on being thermoset, all the highly water-soluble resins produced as described in Examples VII through XII, in which unpurified cumene hydroperoxide decomposition products were employed to provide ketone and phenol reactants for the process of this invention, provided bonds having good shear strength and high resistance to loss of shear strength from the action of water on the bonds.

Although the present invention has been described with preferred embodiments, it is to be understood that modifications and variations may be resorted to without departing from the spirit and scope of this invention, as those skilled in the art will readily understand. Such variations and modifications are therefore considered to be within the purview and scope of the appended claims.

We claim:

1. A process for producing a thermosettable water-soluble resin useful as a binder for bonded products made from fibers, particles, or sheets, which bonded products possess properties of high bond strength and are resistant against weakening of the bond from exposure to water, said process comprising simultaneously reacting an aldehyde, a ketone, and a phenol in molar proportions of between 3 and 6 moles of the aldehyde per mole of the phenol and of between 1 and 1.5 moles of the ketone per mole of the phenol, in the presence of a base capable of catalyzing the condensation reaction of the aldehyde, the ketone, and the phenol, at a temperature between 125° F. and 350° F., and for a period of time between 30 minutes and 3 hours; said molar proportions being the molar proportions of the aldehyde, the ketone, and the phenol moieties in the resin product.

2. A process as defined in claim 1, in which the aldehyde is formaldehyde.

3. A process as defined in claim 2, in which the ketone is acetone.

4. A process as defined in claim 2, in which the phenol is phenol.

5. A water-soluble thermosetting resin produced by simultaneously reacting an aldehyde, a ketone, and a phenol in molar proportions of between 3 and 6 moles of the aldehyde per mole of the phenol and of between 1 and 1.5 moles of the ketone per mole of the phenol, in the presence of a base capable of catalyzing the condensation reaction of the aldehyde, the ketone, and the phenol, at a temperature between 125° F. and 350° F., and for a period of time between 30 minutes and 3 hours; said molar proportions being the molar proportions of the aldehyde, the ketone, and the phenol moieties in the resin product.

6. A resin as defined in claim 5, in which the aldehyde is formaldehyde.

7. A resin as defined in claim 5, in which the ketone is acetone.

TABLE II

| Ex. No. | Reactants charged, moles | Condensation catalyst | Reaction time at reflux temperature, hrs. | Lap Shear Strength, p.s.i.[1] Dry | Soak | Boil |
|---|---|---|---|---|---|---|
| VII | Acetone, 1.09; Formaldehyde, 4.0; Phenol, 0.49 | 20 mls. of 10% aqueous NaOH | 1.5 | 381 (50) | 378 (60) | 343 (70) |
| VIII | Acetone, 1.47; Formaldehyde, 4.0; Phenol, 0.84 | 15 mls. of 10% aqueous NaOH | 1.5 | 366 (50) | 343 (70) | 341 (70) |
| IX | Acetone, 2.0; Formaldehyde, 6.0; Phenol, 1.0 | 25 mls. of 10% aqueous NaOH | 2.25 | 373 (80) | 342 (80) | 362 (70) |
| X | Acetone, 2.0; Formaldehyde, 3.0; Phenol, 1.0 | 15 mls. of 10% aqueous NaOH | 2.25 | 393 (70) | 399 (90) | 313 (70) |
| XI | Acetone 2.5; Formaldehyde, 8.0; Phenol, 1.5 | 30 mls. of 10% aqueous NaOH | 1.5 | 357 (70) | 363 (80) | 361 (40) |
| XII | Acetone, 2.5; Formaldehyde, 8.0; Phenol, 1.5 | 35 mls. of 10% aqueous NaOH | 1.5 | 327 (90) | 361 (90) | 383 (80) |

[1] Values in parentheses indicate the percent of wood failure in each shear stress test.

8. A resin as defined in claim 5, in which the phenol is phenol.

References Cited

UNITED STATES PATENTS

| | | | |
|---|---|---|---|
| 1,624,638 | 4/1927 | Terwilliger | 260—50 |
| 1,802,390 | 4/1931 | Novotny | 260—54 |
| 2,538,883 | 1/1951 | Schrimpe | 260—50 |
| 3,006,883 | 10/1961 | Cambron | 260—50 |

FOREIGN PATENTS

| | | |
|---|---|---|
| 678,287 | 9/1952 | Great Britain. |

OTHER REFERENCES

Phenolic Resins, Gould, 1959, pages 65–66, 69–70, and 89–93.

Unit Processes in Organic Synthesis, Kirkpatrick, 1958, pages 515–517 (copy in 140).

Kirk-Othmer: Encyclopedia of Chemical Technology, 1953, vol. 10, pages 293–310.

Adhesives and Adhesion, De Bruyne, pages 203–204 and 222–223, 1951.

WILLIAM H. SHORT, *Primary Examiner.*

H. SCHAIN, *Assistant Examiner.*